US012333300B2

(12) United States Patent
Yang (10) Patent No.: US 12,333,300 B2
(45) Date of Patent: Jun. 17, 2025

(54) METHOD AND APPARATUS FOR MANAGING MODEL FILE IN INFERENCE APPLICATION

(71) Applicant: HUAWEI TECHNOLOGIES CO., LTD., Guangdong (CN)

(72) Inventor: Zhilong Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 127 days.

(21) Appl. No.: 18/150,967

(22) Filed: Jan. 6, 2023

(65) Prior Publication Data

US 2023/0153100 A1  May 18, 2023

Related U.S. Application Data

(63) Continuation of application No. PCT/CN2021/102489, filed on Jun. 25, 2021.

(30) Foreign Application Priority Data

Jul. 13, 2020  (CN) .......................... 202010669862.9

(51) Int. Cl.
*G06F 8/71* (2018.01)
*G06F 8/65* (2018.01)

(52) U.S. Cl.
CPC . *G06F 8/71* (2013.01); *G06F 8/65* (2013.01)

(58) Field of Classification Search
None
See application file for complete search history.

(56) References Cited

U.S. PATENT DOCUMENTS

| 11,301,762 | B1 * | 4/2022 | Chen ...................... G06N 5/027 |
| 11,373,119 | B1 * | 6/2022 | Doshi ..................... H04L 47/70 |
| 2019/0354809 | A1 * | 11/2019 | Ralhan .................. G06F 16/116 |
| 2020/0004595 | A1 * | 1/2020 | Sengupta ................. G06T 1/20 |
| 2020/0004596 | A1 * | 1/2020 | Sengupta ................ G06N 5/04 |
| 2020/0257994 | A1 * | 8/2020 | Ikeda ...................... G06N 5/04 |

FOREIGN PATENT DOCUMENTS

| CN | 109272116 A | 1/2019 |
| CN | 109684420 A | 4/2019 |
| CN | 110532098 A | 12/2019 |
| CN | 111382113 A | 7/2020 |

* cited by examiner

*Primary Examiner* — Qing Chen (57) ABSTRACT

In a method for managing a model file in an inference application, a controller monitors a status of a target model management object. The controller determines, based on a preset field of the inference application, a target inference application that matches the target model management object, where the preset field of the target inference application identifies the target model management object corresponding to a target model file in the inference application. The controller then manages the updating or deletion of the target model file in the target inference application based on the status of the target model management object.

10 Claims, 5 Drawing Sheets

METHOD AND APPARATUS FOR MANAGING MODEL FILE IN INFERENCE APPLICATION

CROSS-REFERENCE TO RELATED APPLICATIONS

This application is a continuation of International Application. PCT/CN2021/102489, filed on Jun. 25, 2021, which claims priority to Chinese Patent Application No. 202010669862.9, filed on Jul. 13, 2020. The disclosures of the aforementioned priority applications are hereby incorporated by reference in their entirety.

TECHNICAL FIELD

This application relates to the field of computer technologies, and in particular, to a method and an apparatus for managing a model file in an inference application, a device, and a computer-readable storage medium.

BACKGROUND

At present, machine deep learning is used in many fields such as image processing, text recognition, and language processing. The so-called deep learning refers to expression of attribute categories or features through more abstract high-level representation by combining low-level features, to discover distributed feature representation of data, and then perform classification, regression, and the like on the data. Deep learning is generally divided into two phases: training (training) and inference (inference). Training is a process of giving a model a specific capability. A result of training is usually one or more deep learning models, and the model can be applied to new data to obtain results such as prediction and evaluation. Inference is a process of using such a capability to make some specific decisions in a real environment, that is, a process of model application.

The model obtained through training may be deployed to a formal production environment for an inference service. In practical application, automated deployment may be performed through a container orchestration engine, or the like. For example, Kubernetes is used as the container orchestration engine. After a training application of a training device completes the training and generates a model file, an inference application needs to be notified to load the model file. Then, the inference application loads an inference file for model deployment, to externally provide an inference service.

However, notifying the inference application to load a model file requires deployment of a management module on the training device and deployment of an additional management module agent on an inference device. This makes model file management more complex. In view of this, a simpler and more efficient model file management method is urgently needed in the industry to make model deployment less complex.

SUMMARY

This application provides a method for managing a model file in an inference application. According to the method, a preset field of the inference application is used to associate the inference application with a model file through a model management object, to implement management of the model file in the inference application. There is no need to deploy an additional management module or management module agent. This simplifies a process of managing the model file, improves management efficiency, and makes model deployment less complex. This application further provides an apparatus corresponding to the method, a device, a computer-readable storage medium, and a computer program product.

According to a first aspect, this application provides a method for managing a model file in an inference application. In this method, for a model file, a model management object describing the model file is created. The model management object mentioned in this embodiment of this application may also be referred to as a model manager (model manager). A preset field of the inference application is used to identify a model management object corresponding to the model file in the inference application. Based on this, a status of a target model management object may be monitored, a target inference application that matches the target model management object may be determined based on the preset field of the inference application, and a model file in the target inference application may be managed based on the status of the target model management object.

In the method, unified management of the model files in the target inference application can be implemented without deploying an additional management module and management module agent. This makes model file management less complex, and further makes model deployment less complex. In addition, this method does not require deployment of a deep learning framework, for example, TF Serving, in the inference application, or require the training application to use a framework with same ecology as the inference application, for example, tensor flow. Therefore, the method has high availability.

In some possible implementations, when the status of the target model management object indicates that the target model management object is deleted, the target inference application may be notified to delete the model file, thereby implementing management of the model file in the target inference application. The method implements unified management through a native management mechanism, without a need to deploy a management module and management module agent or use the deep learning framework to notify the target inference application. This makes management less complex and improves management efficiency.

In some possible implementations, when the status of the target model management object indicates that the target model management object is updated, the target inference application may be notified to update the model file, thereby implementing management of the model file in the target inference application. The method implements unified management through the native management mechanism, without the need to deploy a management module and management module agent or use the deep learning framework to notify the target inference application. This makes management less complex and improves management efficiency.

In some possible implementations, the preset field of the inference application includes a label (label) or an annotation (annotation). Having a strict naming rule, a label is usually used to define metadata (metadata) of a Kubernetes object (for example, the inference application) and is used for a label selector (label selector). As "additional" information arbitrarily defined by a user, the annotation may include a character that is not allowed by the label, to facilitate search by an external tool. The preset field is used to identify the model management object corresponding to the model file in the inference application. When an identifier of the model management object is regular, the label may be used to identify the model management object corresponding to the model file. When the identifier of the model management object includes rich information, the annotation may be used to identify the model management object corresponding to the model file.

In some possible implementations, the target model management object is created through a custom resource definition (custom resource definition, CRD) interface. Kubernetes provides a CRD interface, through which the user can customize a new type of resource object, so that an application programming interface (application programming interface, API) of Kubernetes can be extended without modification of Kubernetes source code. This greatly improves scalability of Kubernetes.

During specific implementation, the user can register a resource type, for example, a model manager type, in Kubernetes through a client, for example, an integrated development environment (integrated development environment, IDE), where the resource type is mainly used to describe the model file. When the training application generates the model file, the user may further create a model manager instance by using the registered model manager type through the IDE. The model manager instance is used to describe a specific model file. Generally, one model file corresponds to one model manager instance (which may be referred to as a model manager for short).

In some possible implementations, the target inference application is deployed in a Kubernetes cluster, and this method may be specifically performed by a model controller (model controller). The model controller is essentially a process, which may be generated by executing manually written code with a corresponding function. The process is run on a master (Master) in the Kubernetes cluster, and is used for unified management of model files of target inference applications of worker nodes (Node) deployed in the Kubernetes cluster.

According to a second aspect, this application provides a method for managing a model file in an inference application. A preset field of the inference application is used to identify a model management object corresponding to the model file in the inference application. The inference application may receive a management notification, where the management notification His generated based on a status of the model management object, and the management notification is used to indicate the inference application to manage the model file. Then, the inference application may manage the model file based on the management notification.

In the method, the preset field of the inference application associates the inference application with the model file through the model management object. Therefore, when a model controller monitors the status of the model management object, if it is detected that the model file is deleted or updated, the model controller may send the management notification to the corresponding inference application, to indicate the inference application to delete or update the model file. This implements unified management of the model files without deploying an additional management module or management module agent or requiring the training application to use a framework with same ecology as the inference application.

In some possible implementations, the management notification is used to indicate the inference application to delete the model file. Correspondingly, the inference application may delete the model file based on the management notification. This simplifies a process of deleting the model file and makes model file management less complex.

In some possible implementations, the management notification is used to indicate the inference application to update the model file. Correspondingly, the inference application may obtain a new version of model file and load the new version of model file to update the model file. This simplifies a process of updating the model file and makes model file management less complex.

According to a third aspect, this application provides an apparatus for managing a model file in an inference application. The apparatus includes:
a monitoring unit, configured to monitor a status of a target model management object;
a determining unit, configured to determine, based on a preset field of an inference application, a target inference application that matches the target model management object, where the preset field of the inference application is used to identify a model management object corresponding to a model file in the inference application; and
a management unit, configured to manage a model file in the target inference application based on the status of the target model management object.

In some possible implementations, the management unit is specifically configured to:
when the status of the target model management object indicates that the target model management object is deleted, notify the target inference application to delete the model file.

In some possible implementations, the management unit is specifically configured to:
when the status of the target model management object indicates that the target model management object is updated, notify the target inference application to update the model file.

In some possible implementations, the preset field of the inference application includes a label or an annotation.

In some possible implementations, the target model management object is created through a custom resource definition CRD interface.

In some possible implementations, the target inference application is deployed in a Kubernetes cluster, and the apparatus for managing a model file in an inference application is a model controller.

According to a fourth aspect, this application provides an apparatus for managing a model file in an inference application. A preset field of the inference application is used to identify a model management object corresponding to the model file in the inference application. The apparatus includes:
a communication unit, configured to receive a management notification, where the management notification is generated based on a status of the model management object, and the management notification is used to indicate the inference application to manage the model file; and a management unit, configured to manage the model file based on the management notification.

In some possible implementations, the management notification is used to indicate the inference application to delete the model file; and
the management unit is specifically configured to:
delete the model file.

In some possible implementations, the management notification is used to indicate the inference application to update the model file; and
the management unit is specifically configured to:
obtain a new version of model file; and
load the new version of model file to update the model file.

According to a fifth aspect, this application provides a computing device, where the computing device includes a processor and a memory. The processor and the memory communicate with each other. The processor is configured to execute instructions stored in the memory, so that the computing device performs the method for managing a model file in an inference application according to any one of the first aspect, the second aspect, the implementations of the first aspect, or the implementations of the second aspect.

According to a sixth aspect, this application provides a computer-readable storage medium, where the computer-readable storage medium stores instructions, and the instructions are used to instruct a computing device to perform the method for managing a model file in an inference application according to any one of the first aspect, the second aspect, the implementations of the first aspect, or the implementations of the second aspect.

According to a seventh aspect, this application provides a computer program product including instructions. When the computer program product runs on a computing device, the computing device is enabled to perform the method for managing a model file in an inference application according to any one of the first aspect, the second aspect, the implementations of the first aspect, or the implementations of the second aspect.

This application may further combine the implementations provided in the foregoing aspects to provide more implementations.

BRIEF DESCRIPTION OF DRAWINGS

To describe the technical methods in embodiments of this application more clearly, the following briefly describes the accompanying drawings used in embodiments.

DESCRIPTION OF EMBODIMENTS

The terms "first" and "second" in embodiments of this application are used only for a purpose of description, and shall not be understood as an indication or implication of relative importance or implicit indication of a quantity of indicated technical features. Therefore, a feature limited by "first" or "second" may explicitly indicate or implicitly include one or more such features.

Some technical terms in embodiments of this application are described first.

An application (application, app) is a collection of computer programs written for a specific application purpose of a user, and may be specifically application software including a single application program or a collection of a plurality of application programs. For example, an application may be an e-commerce system formed by a collection of a plurality of application programs such as a product, an order, and a user. For another example, an application may be an application program such as an editor.

With continuous development of artificial intelligence (artificial intelligence, AI) technology, the industry has proposed an application construction method based on an AI model. Specifically, the AI model may be obtained through training by using a deep learning (deep learning) method. Deep learning is generally divided into two phases: training (training) and inference (inference). Training is a process of giving a model a specific capability. A result of training is usually one or more deep learning models, and the model can be applied to new data to obtain results such as prediction and evaluation. Inference is a process of using such a capability to make some specific decisions in a real environment, that is, a process of model application.

A training application on a training device trains the model. When the training application completes training, a model file may be generated. The model file is used to construct the application. In some implementations, the model file may include a weight matrix consisting of weights of neurons of the model. The inference application on the inference device may load the model file for model deployment, to externally provide an inference service.

The training device and the inference device may be devices in a cluster. Specifically, the cluster includes at least one training device and at least one inference device. In addition, the cluster may further include at least one management device. The management device is configured to manage the training device and the inference device. A plurality of training devices and a plurality of inference devices may perform load balancing, and a plurality of management devices may implement redundancy. When the training application on the training device generates a new version of model file, it is difficult for the inference application on the inference device to be aware of the new version of model file. Therefore, the inference application needs to be notified to load the new version of model file to update the model.

Currently, the industry has proposed some methods to manage a model file in the inference application. For example, an additional management module is deployed on the training device, and an additional management module agent is deployed on the inference device. When the training application on the training device generates a new version of model file, the management module notifies the management module agent, and then the management module agent notifies the inference application, so that the inference application obtains the new version of model file from a storage device and loads the model file to update a model. The storage device may be a device in the cluster, or may be an external device mounted on the cluster. However, this method requires deployment of an additional management module and management module agent. This makes model file management more complex, and further makes model deployment more complex.

In view of this, an embodiment of this application provides a method for managing a model file in an inference application. In this method, for a model file, a model management object describing the model file is created. The model management object mentioned in embodiments of this application may also be referred to as a model manager (model manager). A preset field of the inference application is used to identify a model management object corresponding to the model file in the inference application. Based on this, a status of a target model management object may be monitored, a target inference application that matches the target model management object may be determined based on the preset field of the inference application, and a model file in the target inference application may be managed based on the status of the target model management object.

In the method, unified management of the model files in the target inference application can be implemented without deploying an additional management module and management module agent. This makes model file management less complex, and further makes model deployment less complex. In addition, this method does not require deployment of a deep learning framework, for example, TF Serving, in the inference application, or require a training application to use a framework with same ecology as the inference application, for example, tensor flow. Therefore, the method has high availability.

To make technical solutions of this application clearer and easier to understand, a system architecture of a method for managing a model file in an inference application is first described below with reference to the accompanying drawings.

Figure 1:
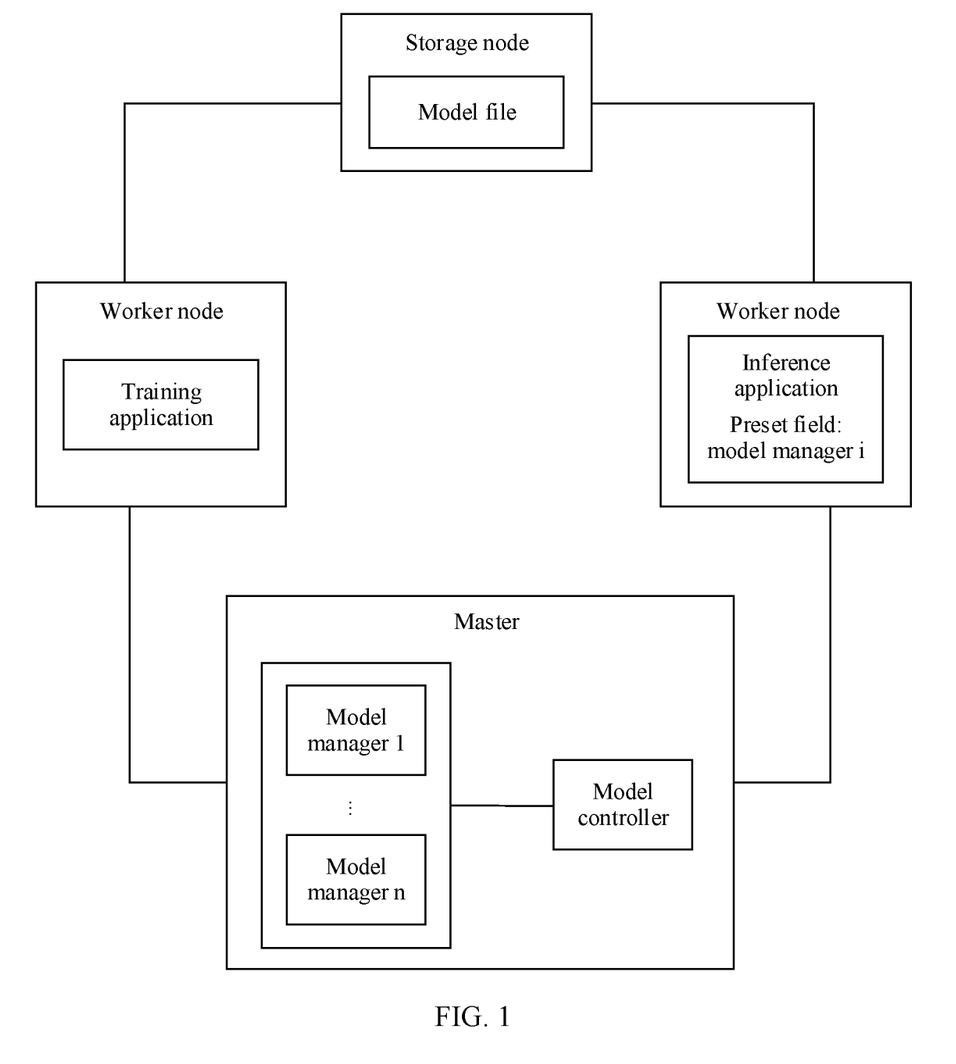
FIG. 1 is a diagram of a system architecture of a method for managing a model file in an inference application according to an embodiment of this application.

FIG. 1 is a diagram of a system architecture of a method for managing a model file in an inference application. As shown in FIG. 1, the cluster is Kubernetes (which may also be referred to as k8s for short) cluster. The k8s cluster classifies devices (physical machines) in the cluster or virtual machines running on the devices into masters (Master) and worker nodes (Node).

A management device in the cluster or a virtual machine running on the management device is a master. A set of processes related to cluster management, such as an interface server (kube-apiserver), a kube controller manager (kube-controller-manager), and a scheduler (kube-scheduler), are run on the master. Through these processes, the master can implement management capabilities such as resource management, container group scheduling, elastic scaling, security control, system monitoring, and error correction for the entire cluster.

A training device used for model training in the cluster or a virtual machine running on the training device, and an inference device, in the cluster, used for inference of an application model or a virtual machine running on the inference device are nodes. As shown in FIG. 1, at least one node runs a training application, and at least one node runs an inference application. A node running the training application and a node running the inference application are usually different.

A storage node is further mounted to the k8s cluster. The storage node is configured to store a model file. In some possible implementations, the storage node may be alternatively a node in the k8s cluster, for example, an independent storage node in the k8s cluster, or a node in the k8s cluster that has a function of storing a model file.

Specifically, the training application trains a model, and when the training is completed, the training application generates a model file, and then stores the model file in the storage node. A model management object for the model file is generated on the master. In this example, n training applications generate model files separately, where each model file corresponds to one model management object. For ease of description, these n model management objects are denoted as model manager 1, . . . , and model manager n, where n is a positive integer.

When an inference application is created on the node, an identifier of a model management object corresponding to a model file loaded by the inference application may be further written into a reserved field for the inference application. For example, a field value of a reserved field for an inference application may be an identifier of model manager i, where $1 \leq i \leq n$.

The master further runs a model controller (model controller). The model controller is essentially a process, which may be generated by executing manually written code with a corresponding function. Specifically, the model controller may monitor a status of a target model manager. The target model manager may be any one or more of the model managers. The model controller determines, based on a preset field of the inference application, a target inference application that matches the foregoing target model management object. Then, the model controller may manage a model file in the target inference application based on the status of the target model manager.

In the example of FIG. 1, the target model manager may be model manager i, where $1 \leq i \leq n$. The model controller may determine that an inference application with a field value of the preset field being an identifier of model manager i is the target inference application. The model controller manages the model file in the target inference application based on the status of model manager i.

In some cases, the node running the training application and the node running the inference application may be alternatively a same node. Further, the node may run a plurality of applications. For example, the node may run one training application and another inference application. For another example, the node may run different training applications (or different inference applications). For another example, the node may run one training application and an inference application corresponding to the training application.

FIG. 1 is described by using an example in which the k8s cluster includes one master and two nodes. In another possible implementation of this embodiment of this application, there may be a plurality of nodes, on which applications may be deployed in a distributed manner to implement load balancing. There may also be a plurality of masters, and the plurality of masters may implement redundancy, thereby ensuring reliability of the entire system.

Further, the inference application may be alternatively deployed in another cluster other than the k8s cluster. The k8s cluster is only an example of this application, and does not constitute a limitation on the technical solution of this application. Correspondingly, the foregoing method is not limited to being performed by the model controller, for example, the method may be alternatively performed by another application or functional module having functions of monitoring a status of the model manager and managing a model file in a corresponding inference application based on the status of the model manager.

The system architecture of the method for managing a model file in an inference application is described in detail in FIG. 1. Next, an application environment of the method for managing a model file in an inference application is described in detail below with reference to the accompanying drawings.

Figure 2:
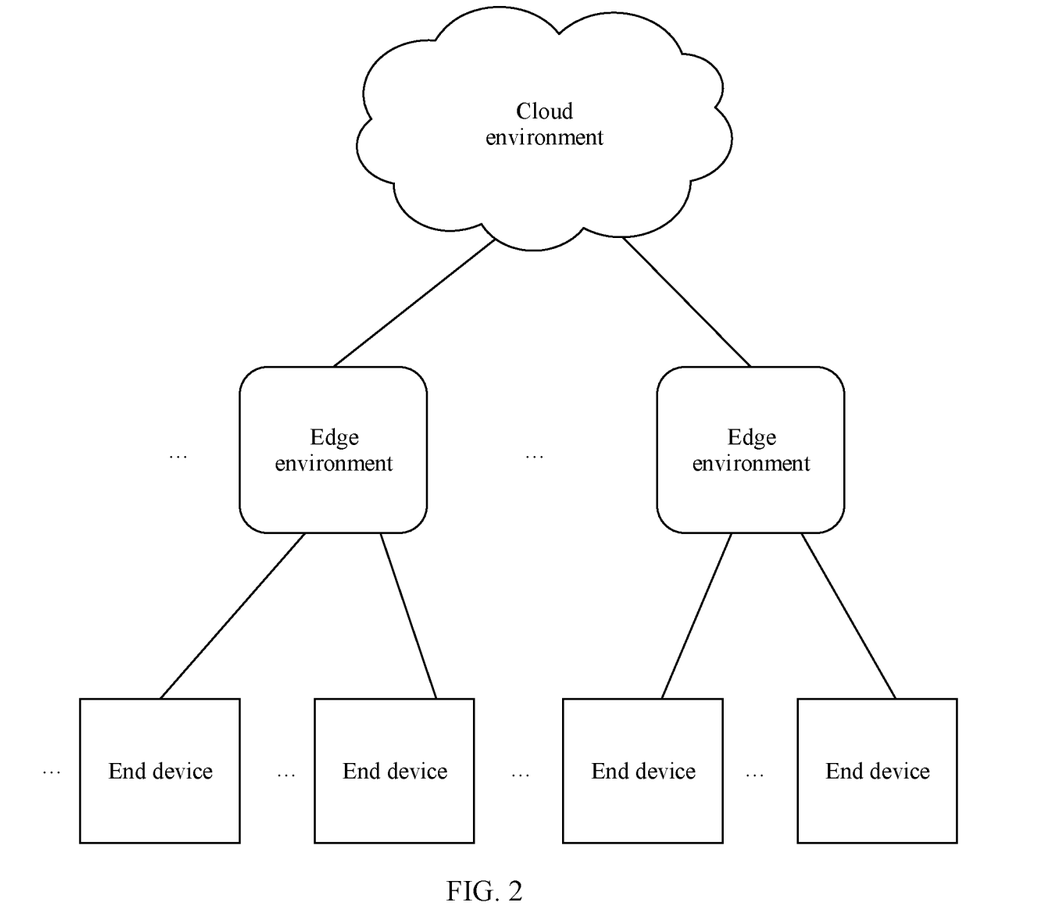
FIG. 2 is a diagram of an application environment of a method for managing a model file in an inference application according to an embodiment of this application.

As shown in FIG. 2, the master and the node may be physical machines or virtual machines in a cloud environment. The cloud environment is specifically a computing cluster including at least one cloud computing device (for example, a central server). In some implementations, the master and the node may be alternatively physical machines or virtual machines in an edge environment. The edge environment is specifically a computing cluster including at least one edge computing device (for example, an edge server). In some other implementations, the master and the node may be alternatively end devices or virtual machines on the end devices.

It should be noted that the master and the node may be physical machines or virtual machines in a same environment, or may be physical machines or virtual machines in different environments. For example, the master may be a physical machine in the cloud environment, and the node may be a physical machine in the edge environment.

The method for managing a model file in an inference application provided in embodiments of this application is described in detail below by still using the scenario of the Kubernetes cluster as an example.

Figure 3:
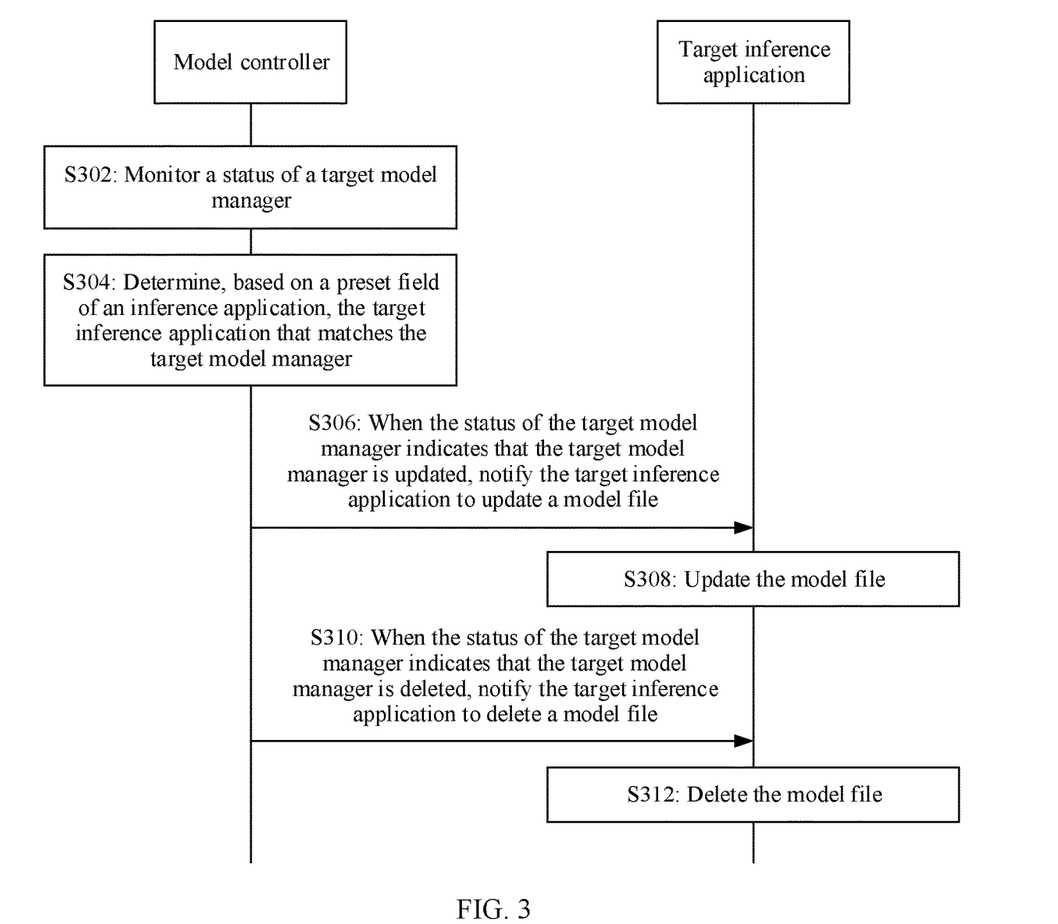
FIG. 3 is an interactive flowchart of a method for managing a model file in an inference application according to an embodiment of this application.

FIG. 3 is a flowchart of a method for managing a model file in an inference application. The method includes the following steps.

S302: A model controller monitors a status of a target model manager.

The target model manager may be any one or more of the model managers. The model manager is an object used to describe a model file. When a training application generates a model file, a model manager corresponding to the model file is generated on a master. The model manager is essentially a custom resource object. Specifically, the resource object may be created through a custom resource definition (CRD) interface.

Kubernetes provides a CRD interface, through which a user can customize a new type of resource object, so that an application programming interface (application programming interface, API) of Kubernetes can be extended without modification of Kubernetes source code. This greatly improves scalability of Kubernetes.

During specific implementation, the user can register a resource type, for example, a model manager type, in Kubernetes through a client, for example, an integrated development environment (integrated development environment, IDE), where the resource type is mainly used to describe the model file. When the training application generates the model file, the user may further create a model manager instance by using the registered model manager type through the IDE. The model manager instance is used to describe a specific model file. Generally, one model file corresponds to one model manager instance (which may be referred to as a model manager for short).

The model manager is a resource object, and the resource object may generally include a plurality of states such as being deleted and being updated. The model controller monitors the status of the target model manager by specifically monitoring whether the target model manager is deleted or updated.

In some possible implementations, the model controller may monitor an update message and a delete message for the target model manager, thereby monitoring the status of the target model manager. For example, when the model controller detects an update message for the target model manager, it indicates that the status of the target model manager is that the target model manager is updated. For another example, when the model controller detects a delete message for the target model manager, it indicates that the status of the target model manager is that the target model manager is deleted.

S304: The model controller determines, based on a preset field of an inference application, a target inference application that matches the target model manager.

The inference application is essentially a resource object, and Kubernetes provides at least one attribute field to describe the resource object. The preset field may be one or more of the at least one attribute field provided by Kubernetes. The preset field may be used to identify the model manager corresponding to the model file in the inference application. Based on this, a field value of the preset field may be set as an identifier of the model manager corresponding to the model file in the inference application, for example, a number of the model manager, or the name of the model manager.

In some implementations, the preset field may be a label (label) or an annotation (annotation). A length of the label is usually fixed, and a length of the annotation may or may not be fixed. Therefore, when a length of an identifier of the model manager is not fixed, the preset field may be an annotation, and when the length of the identifier of the model manager is fixed, the preset field may be an annotation or a label.

The model controller may obtain a field value of a preset field of at least one inference application, and determine, based on the field value, a target inference application that matches the target model manager. For ease of understanding, a specific example is used for description below. In this example, the identifier of the model manager is the name of the model manager, where the name of the target model manager is resNet50. The model controller obtains field values of preset fields of a plurality of inference applications, for example, field values of a label field, which are specifically vggnet64, resNet50, resNet128, and the like. Then, the model controller matches the name "resNet50" of the target model manager with the field values "vggnet64", "resNet50", "resNet128", and the like obtained by the model controller, and determines that an inference application including a label with a field value of "resNet50" is the target inference application.

It should be noted that S302 and S304 may be performed at the same time, or may be performed in a specified sequence, for example, S302 is performed before S304, or S304 is performed before S302. A specific execution order is not limited in this embodiment of this application.

S306: When the status of the target model manager indicates that the target model manager is updated, the model controller notifies the target inference application to update the model file.

The model controller generates a management notification based on the status of the target model manager, where the management notification is used to indicate the target inference application to manage the model file. The management notification may vary with the status of the target model manager.

Specifically, when the status of the target model manager indicates that the target model manager is updated, the management notification generated by the model controller may be a notification message notifying the target inference application to update the model file. The model controller sends the notification message to the target inference application, to notify the target inference application to update the model file.

S308: The target inference application updates the model file.

The target inference application may obtain a new version of model file from a storage device, and then load the new version of model file to overwrite an old version of model file, so as to update the model file. In some implementations, the target inference application may alternatively delete the old version of model file first, and then obtain and load the new version of model file, to update the model file.

In some possible implementations, when loading the new version of model file, the target inference application may be restarted.

S310: When the status of the target model manager indicates that the target model manager is deleted, the model controller notifies the target inference application to delete the model file.

Specifically, when the status of the target model manager indicates that the target model manager is deleted, the management notification generated by the model controller may be a notification message notifying the target inference application to delete the model file. The model controller sends the notification message to the target inference application, to notify the target inference application to delete the model file.

S312: The target inference application deletes the model file.

Specifically, when receiving the notification message indicating deletion of the model file, the target inference application directly deletes a model file in the target inference application.

It should be noted that, S306 and S308 or S310 and S312 are steps of an implementation in which the model controller manages the model file in the target inference application based on the status of the target model manager. The model controller may perform either of the implementations, for example, the model controller may perform S306 and S308 after performing S302 and S304, or perform S310 and S312 after performing S302 and S304.

In some possible implementations, the model controller may alternatively perform both S306 and S308, and S310 and S312. For example, the model controller may perform S306 and S308 after performing S302 and S304, and then perform S310 and S312. For another example, the model controller may alternatively perform S310 and S312 after performing S302 and S304, and then perform S306 and S308.

In some possible implementations, the user may further view a status of the model file by viewing the status of the model manager. Specifically, the user may invoke a Kubernetes interface through a client, for example, the IDE, to view the status of the model manager. Correspondingly, a master may return the status of the model file described by the model manager.

Based on the foregoing content descriptions, this embodiment of this application provides the method for managing a model file in an inference application. According to the method, the preset field of the inference application is used to associate the inference application with the model manager corresponding to the model file. In this way, the model controller may determine, based on the foregoing association relationship, a target inference application corresponding to the target model manager. The model controller determines, by monitoring the status of the target model manager, whether the model file is updated or deleted, and then notifies, based on the status of the target model manager, the target inference application to update or delete the model file in the target inference application, so as to implement management of the model file in the target inference application. Model files are uniformly managed by Kubernetes, and the model controller automatically notifies the inference application to update or delete the model file. In this case, there is no need to deploy an additional management module and management module agent, and the training application does not need to use a framework with same ecology as the inference application. This makes model file management less difficult, and further makes model deployment less difficult.

The embodiment shown in FIG. 3 describes in detail, from the perspective of interaction, the method for managing a model file in an inference application provided in embodiments of this application. Next, with reference to a specific example, the method for managing a model file in an inference application provided in embodiments of this application is described in detail below.

Specifically, the method for managing a model file in an inference application provided in embodiments of this application may include the following steps:

1. A user registers a model manager type in Kubernetes through a client, for example, the IDE, where the model manager type is used to describe a model file. Specific code is as follows:

```
apiVersion: apiextensions.k8s.io/v1beta1
kind: CustomResourceDefinition
metadata:
    # Name needs to match the spec field below, and be in the form: <plural>.<group>
    name: modelmanagers.model.k8s.io
spec:
    # Group name to use for REST API: /apis/<group>/<version>
    group: model.k8s.io
    # List of versions supported by this CustomResourceDefinition
    versions:
        - name: v1
          # Each version can be enabled/disabled by Served flag.
          served: true
          # One and only one version need to be marked as the storage version.
          storage: true
    # Specify the scope of crd resource in either Namespaced or Cluster
    scope: Namespaced
    names:
    # Plural name to be used in the URL: /apis/<group>/<version>/<plural>
    plural: model managers
        # Singular names to be used as an alias on the CLI (parameters input in a shell
interface) and for display
        singular: model manager
        # kind field is normally the camelcased singular type. Resource manifests use this.
        kind: Model Manager
        # shortNames allow shorter string to match your resource on the CLI, which means
```

-continued that a resource can be obtained through a short name of the resource when the resource is viewed through kubectl.
    shortNames:
    - mdm Among them, apiVersion and kind are used to declare an API version and the use of CRD to create a model manager. Various attributes of the model manager are defined in metadata, including name, spec, version, and the like.

2. The user creates a model manager instance through a client, for example, the IDE to describe a specific model file, where one model file corresponds to one model manager. For example, a model manager named resNet50 is created to describe a model file named resNet50:

```
apiVersion: model.k8s.io/v1
kind: model manager
metadata:
   name: resNet50
spec:
   name: "resNet50.pb"
   size: "250 MB"
```

In this example, an identifier of the model manager is the name of the model manager, for example, "resNet50".

3. The user may further create an inference application through the client, and add an identifier of a target model management object to a label of the inference application. Details are shown below:

```
apiVersion: v1
kind: Pod
metadata:
   name: inference-pod
   labels:
      model: resNet50
spec:
   containers:
      - name: inference-pod1
        image: atlasinference:1.2.1
        volumeMounts:
        - mountPath: /mnt/model
          name: host-model
   volumes:
      - name: host-model
        nfs:
           server: nfs.model.com
           path: /home/data
```

In this example, a field value of the label of the inference application is "resNet50".

4. The user creates a model controller by using a Kubernetes controller mechanism through a client, for example, the IDE, to update or delete ModelManager.

5. The model controller monitors a status of the model manager named "resNet50".

6. When the status of the model manager named "resNet50" indicates that the model manager is updated, the model controller notifies the inference application including a label with the field value of "resNet50" to update the model file.

7. When the status of the model manager named "resNet50" indicates that the model manager is deleted, the model controller notifies the inference application including a label with the field value of "resNet50" to delete the model file.

Steps 6 and 7 are optional steps, which may not be performed in some possible implementations.

The method for managing a model file in an inference application provided in embodiments of this application is described in detail above with reference to FIG. 1 to FIG. 3, and an apparatus and a device provided in embodiments of this application will be described below with reference to the accompanying drawings.

Figure 4:
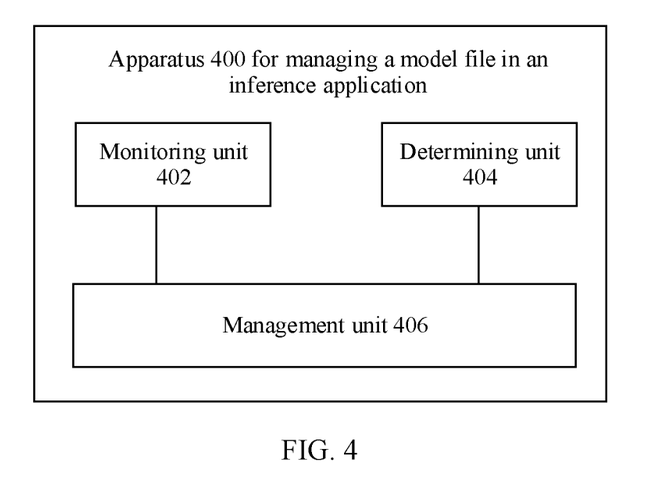
FIG. 4 is a schematic diagram of a structure of an apparatus for managing a model file in an inference application according to an embodiment of this application.

FIG. 4 is a schematic diagram of a structure of an apparatus for managing a model file in an inference application. The apparatus 400 includes:
a monitoring unit 402, configured to monitor a status of a target model management object;
a determining unit 404, configured to determine, based on a preset field of an inference application, a target inference application that matches the target model management object, where the preset field of the inference application is used to identify a model management object corresponding to a model file in the inference application; and
a management unit 406, configured to manage a model file in the target inference application based on the status of the target model management object.

In some possible implementations, the management unit 406 is specifically configured to:
when the status of the target model management object indicates that the target model management object is deleted, notify the target inference application to delete the model file.

In some possible implementations, the management unit 406 is specifically configured to:
when the status of the target model management object indicates that the target model management object is updated, notify the target inference application to update the model file.

In some possible implementations, the preset field of the inference application includes a label or an annotation.

In some possible implementations, the target model management object is created through a custom resource definition CRD interface.

In some possible implementations, the target inference application is deployed in a Kubernetes cluster, and the apparatus for managing a model file in an inference application is a model controller.

The apparatus 400 for managing a model file in an inference application in this embodiment of this application may correspondingly perform the method described in embodiments of this application, and the above-mentioned and other operations and/or functions of the modules/units in the apparatus 400 for managing a model file in an inference application are respectively intended for implementing the corresponding procedures of the methods in the embodiment shown in FIG. 3. For brevity, details are not described herein again.

An embodiment of this application further provides another apparatus for managing a model file in an inference application. The apparatus is described in detail below with reference to the accompanying drawing.

Figure 5:
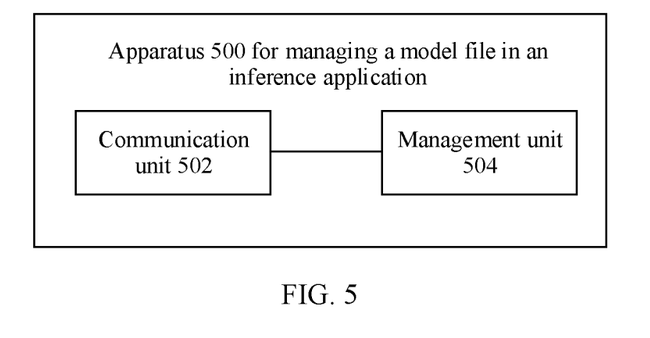
FIG. 5 is a schematic diagram of a structure of an apparatus for managing a model file in an inference application according to an embodiment of this application.

FIG. 5 is a schematic diagram of a structure of an apparatus for managing a model file in an inference application. A preset field of the inference application is used to identify a model management object corresponding to the model file in the inference application. The apparatus 500 includes:

a communication unit 502, configured to receive a management notification, where the management notification is generated based on a status of the model management object, and the management notification is used to indicate the inference application to manage the model file; and a management unit 504, configured to manage the model file based on the management notification.

In some possible implementations, the management notification is used to indicate the inference application to delete the model file; and the management unit 504 is specifically configured to: delete the model file.

In some possible implementations, the management notification is used to indicate the inference application to update the model file; and the management unit 504 is specifically configured to: obtain a new version of model file; and
load the new version of model file to update the model file.

The apparatus 500 for managing a model file in an inference application in this embodiment of this application may correspondingly perform the method described in embodiments of this application, and the above-mentioned and other operations and/or functions of the modules/units in the apparatus 500 for managing a model file in an inference application are respectively intended for implementing the corresponding procedures of the methods in the embodiment shown in FIG. 3. For brevity, details are not described herein again.

An embodiment of this application further provides a computing device 600. The computing device 600 may be an end-side device such as a notebook computer or a desktop computer, or may be a cluster of computers in a cloud environment or an edge environment. The computing device 600 is specifically configured to implement the functions of the apparatus 400 for managing a model file in an inference application in the embodiment shown in FIG. 4.

Figure 6:
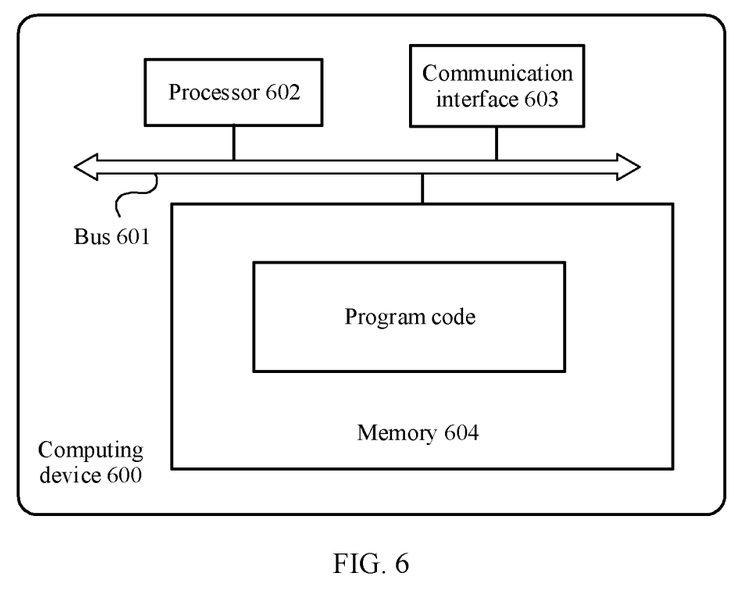
FIG. 6 is a schematic diagram of a structure of a computing device according to an embodiment of this application.

FIG. 6 is a schematic diagram of a structure of a computing device 600. As shown in FIG. 6, the computing device 600 includes a bus 601, a processor 602, a communication interface 603, and a memory 604. The processor 602, the memory 604, and the communication interface 603 communicate with each other through the bus 601.

The bus 601 may be a peripheral component interconnect (peripheral component interconnect, PCI) bus, an extended industry standard architecture (extended industry standard architecture, EISA) bus, or the like. The bus may be classified into an address bus, a data bus, a control bus, and the like. For ease of representation, only one bold line is used for representation in FIG. 6, but this does not mean that there is only one bus or only one type of bus.

The processor 602 may be any one or more of the following processors: a central processing unit (central processing unit CPU), a graphics processing unit (graphics processing unit, GPU), a microprocessor (microprocessor, MP), or a digital signal processor (digital signal processor DSP).

The communication interface 603 is configured to communicate with the outside, for example, send a management notification to an inference application, to indicate the inference application to delete or update a model file in the inference application.

The memory 604 may include a volatile memory (volatile memory), for example, a random access memory (random access memory, RAM). The memory 604 may further include a non-volatile memory (non-volatile memory), for example, a read-only memory (read-only memory, ROM), a flash memory, a hard disk drive (hard disk drive, HDD), or a solid state drive (solid state drive, SSD).

The memory 604 stores executable code, and the processor 602 executes the executable code to perform the foregoing method for managing a model file in an inference application.

Specifically, when the embodiment shown in FIG. 4 is implemented, and the units of the apparatus 400 for managing a model file in an inference application described in the embodiment of FIG. 4 are implemented by software, software or program code required for performing the functions of the monitoring unit 402, the determining unit 404, and the management unit 406 in FIG. 4 is stored in the memory 604. The processor 602 executes the program code, stored in the memory 604, corresponding to the units, for example, program code corresponding to the monitoring unit 402 is executed to perform the operation of monitoring a status of a target model management object; program code corresponding to the determining unit 404 is executed to perform the operation of determining, based on a preset field of an inference application, a target inference application that matches the target model management object; and then program code corresponding to the management unit 406 is executed to perform the step of managing a model file in the target inference application based on the status of the target model management object.

In some possible implementations, the processor 602 executes the program code corresponding to the management unit 406, to specifically perform the following step:

when the status of the target model management object indicates that the target model management object is deleted, notifying the target inference application to delete the model file.

In some possible implementations, the processor 602 executes the program code corresponding to the management unit 406, to specifically perform the following step:

when the status of the target model management object indicates that the target model management object is updated, notifying the target inference application to update the model file.

In some possible implementations, the preset field of the inference application includes a label or an annotation.

In some possible implementations, the target model management object is created through a custom resource definition CRD interface.

In some possible implementations, the target inference application is deployed in a Kubernetes cluster, and the method is applied to a model controller.

An embodiment of this application further provides a computing device 700. The computing device 700 may be an end-side device such as a notebook computer or a desktop computer, or may be a cluster of computers in a cloud environment or an edge environment. The computing device 700 is specifically configured to implement the functions of the apparatus 500 for managing a model file in an inference application in the embodiment shown in FIG. 5.

Figure 7:
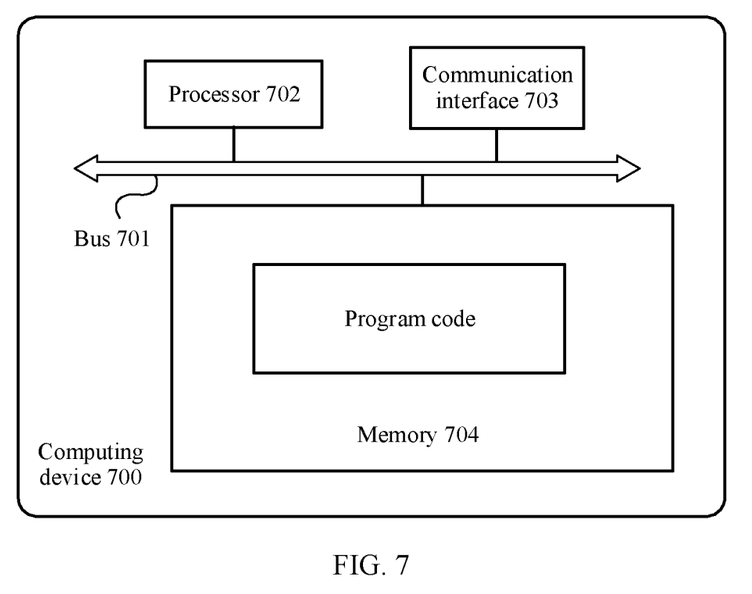
FIG. 7 is a schematic diagram of a structure of a computing device according to an embodiment of this application.

FIG. 7 is a schematic diagram of a structure of a computing device 700. As shown in FIG. 7, the computing device 700 includes a bus 701, a processor 702, a communication interface 703, and a memory 704. The processor 702, the memory 704, and the communication interface 703 communicate with each other through the bus 701. For specific implementation of the bus 701, the processor 702, the communication interface 703, and the memory 704, refer to the descriptions of related content of the embodiment shown in FIG. 6. Details are not described herein again.

The communication interface 703 is configured to communicate with the outside, for example, receive a management notification, where the management notification is generated based on a status of a model management object, and the management notification is used to indicate an inference application to manage a model file.

The memory 704 stores executable code, and the processor 702 executes the executable code to perform the foregoing method for managing a model file in an inference application.

Specifically, when the embodiment shown in FIG. 5 is implemented, and the units of the apparatus 500 for managing a model file in an inference application described in the embodiment of FIG. 5 are implemented by software, software or program code required for performing the function of the management unit 504 in FIG. 5 is stored in the memory 704. The function of the communication unit 502 is implemented through the communication interface 703. The communication interface 703 receives the management notification, which is specifically a management notification from the model controller, and then transmits the management notification to the processor through the bus. Then, the processor 702 executes the program code, stored in the memory 704, corresponding to the units, for example, the program code corresponding to the management unit 504 is executed to perform the operation of managing the model file based on the management notification.

In some possible implementations, when the management notification is used to indicate the inference application to delete the model file, the processor 702 executes the program code corresponding to the management unit 504, to specifically perform the following step:

deleting the model file.

In some possible implementations, when the management notification is used to indicate the inference application to update the model file, the processor 702 executes the program code corresponding to the management unit 504, to specifically perform the following step:

obtaining a new version of model file; and
loading the new version of model file to update the model file.

Based on the description of the foregoing implementations, a person skilled in the art may clearly understand that this application may be implemented by software in addition to required universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be in various forms, for example, in a form of an analog circuit, a digital circuit, or a dedicated circuit. However, as for this application, software program implementation is a better implementation in most cases. Based on such an understanding, the technical solutions of this application essentially or the part contributing to the conventional technology may be implemented in the form of a software product. The computer software product is stored in a readable storage medium such as a floppy disk, a USB flash drive, a removable hard disk, a ROM, a RAM, a magnetic disk or an optical disc of a computer, and the computer software product includes several instructions to enable a computer device (which may be a personal computer, a training device, a network device, or the like) to perform the foregoing method according to embodiments of this application.

All or some of the foregoing embodiments may be implemented by using software, hardware, firmware, or any combination thereof. When software is used to implement embodiments, all or some of the embodiments may be implemented in a form of a computer program product.

The computer program product includes one or more computer instructions. When the computer program instructions are loaded and executed on the computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a web site, computer, training device, or data center to another web site, computer, training device, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a training device or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

The foregoing descriptions are merely specific implementations of this application. Any variation or replacement that can be figured out by a person skilled in the art based on the specific implementations provided in this application shall fall within the protection scope of this application.

What is claimed is:

1. A method for managing deep-learning model files in a Kubernetes system, comprising:
monitoring, by a network device functioning as a master node in the Kubernetes system and via a Kubernetes interface, a status of a target model management object;
determining, by the network device, a target inference application that is deployed on a worker node in the Kubernetes system and matches the target model management object based on a preset field of the target inference application, wherein the preset field of the target inference application identifies the target model management object being corresponding to a target model file of the target inference application;
based on the status of the target model management object, notifying, by the network device and via the Kubernetes interface, the target inference application to perform an operation on the target model file of the target inference application according to the status of the target model management object; and
performing, by the worker node in the Kubernetes system, the operation on the target model file of the target inference application according to the status of the target model management object.

2. The method according to claim 1, wherein the step of notifying the target inference application comprises:

when the status of the target model management object indicates that the target model management object is deleted, notifying the target inference application to delete the target model file of the target inference application.

3. The method according to claim 1, wherein the step of notifying the target inference application comprises:
when the status of the target model management object indicates that the target model management object is updated, notifying the target inference application to update the target model file of the target inference application.

4. The method according to claim 1, wherein the preset field of the target inference application comprises a label or an annotation.

5. The method according to claim 1, wherein the network device implements a model controller to execute the steps of monitoring, determining, and notifying.

6. A system for managing deep-learning model files in a Kubernetes system, comprising:
a master node in the Kubernetes system; and
a worker node in the Kubernetes system,
wherein the master node and the worker node in the Kubernetes system are physical machines, and
wherein the master node in the Kubernetes system is configured to perform operations of:
monitoring, via a Kubernetes interface, a status of a target model management object;
determining a target inference application that is deployed on a worker node in the Kubernetes system and matches the target model management object based on a preset field of the target inference application, wherein the preset field of the target inference application identifies the target model management object being corresponding to a target model file of the target inference application; and
based on the status of the target model management object, notifying, via the Kubernetes interface, the target inference application to perform an operation on the target model file of the target inference application according to the status of the target model management object,
wherein the worker node in the Kubernetes system is configured to perform an operation of:
performing the operation on the target model file of the target inference application according to the status of the target model management object.

7. The system according to claim 6, wherein the master node in the Kubernetes system is further configured to perform the operation of notifying the target inference application by:
when the status of the target model management object indicates that the target model management object is deleted, notifying the target inference application to delete the target model file of the target inference application.

8. The system according to claim 6, wherein the master node in the Kubernetes system is further configured to perform the operation of notifying the target inference application by:
when the status of the target model management object indicates that the target model management object is updated, notifying the target inference application to update the target model file of the target inference application.

9. The system according to claim 6, wherein the preset field of the target inference application comprises a label or an annotation.

10. The system according to claim 6, wherein the master node in the Kubernetes system implements a model controller to perform the operations of monitoring, determining, and notifying.

* * * * *